(12) United States Patent
Morabit

(10) Patent No.: US 9,474,205 B2
(45) Date of Patent: Oct. 25, 2016

(54) LINE LOADER FOR A GRASS TRIMMER

(75) Inventor: Vincent D. Morabit, Rock Hill, SC (US)

(73) Assignee: AERO-FLEX TECHNOLOGIES, INC., Rock Hill, SC (US)

(*) Notice: Subject to any disclaimer, the term of this patent is extended or adjusted under 35 U.S.C. 154(b) by 1471 days.

(21) Appl. No.: 12/607,548

(22) Filed: Oct. 28, 2009

(65) Prior Publication Data

US 2010/0101099 A1 Apr. 29, 2010

Related U.S. Application Data

(60) Provisional application No. 61/109,039, filed on Oct. 28, 2008, provisional application No. 61/144,561, filed on Jan. 14, 2009.

(51) Int. Cl.
*A01D 34/416* (2006.01)
*A01D 34/73* (2006.01)

(52) U.S. Cl.
CPC ......... *A01D 34/416* (2013.01); *A01D 34/4166* (2013.01); *A01D 34/4168* (2013.01); *A01D 34/73* (2013.01); *A01D 34/733* (2013.01); *Y10T 29/49826* (2015.01)

(58) Field of Classification Search
CPC ........... A01D 34/416; A01D 34/4166; A01D 34/4168
USPC .................. 30/276, 347, 12.7, 295, DIG. 17
See application file for complete search history.

(56) References Cited

U.S. PATENT DOCUMENTS

| | | | | |
|---|---|---|---|---|
| 4,043,037 A | * | 8/1977 | Okamoto et al. .... | A01D 34/416 30/276 |
| 4,054,992 A | * | 10/1977 | Ballas et al. ....... | A01D 34/4168 30/276 |
| 4,062,114 A | * | 12/1977 | Luick ................. | A01D 34/4166 30/276 |
| 4,068,376 A | * | 1/1978 | Briar .................. | A01D 34/4166 30/276 |
| 4,112,653 A | * | 9/1978 | Ballas et al. ....... | A01D 34/4161 56/12.7 |
| 4,126,991 A | * | 11/1978 | Gobin et al. ....... | A01D 34/4168 56/12.7 |
| 4,295,324 A | * | 10/1981 | Frantello et al. ...... | A01D 34/73 30/276 |
| 4,382,356 A | * | 5/1983 | Ballas, Sr. et al. | A01D 34/4168 56/12.7 |
| 4,461,138 A | * | 7/1984 | Whitman ........................ | 56/12.7 |
| 4,825,627 A | * | 5/1989 | Truderung ..................... | 56/12.7 |
| 5,463,815 A | * | 11/1995 | Fogle ................. | A01D 34/4168 30/276 |
| 5,493,785 A | * | 2/1996 | Lawrence ............. | A01D 34/73 30/276 |
| 5,615,543 A | * | 4/1997 | Caffey et al. .................. | 56/295 |
| 5,761,816 A | | 6/1998 | Morabit et al. | |
| 5,996,233 A | | 12/1999 | Morabit et al. | |
| 6,045,911 A | * | 4/2000 | Legrand et al. ... | A01D 34/4168 30/276 |
| 6,161,292 A | | 12/2000 | Morabit et al. | |
| 6,176,015 B1 | | 1/2001 | Morabit et al. | |

(Continued)

*Primary Examiner* — Clark F Dexter
(74) *Attorney, Agent, or Firm* — Nixon & Vanderhye P.C.

(57) ABSTRACT

In a rotating grass trimmer, a top loading line blade and corresponding head securely hold the cutting lines with multiple orientations of the line blade. An alternative embodiment provides a simplified loading scheme where a cutting line is loaded into the trimmer head from its outside, through a line outlet to a fixed receiver without the need for a moving or mechanical line gripping or biting type mechanism. With this construction, a worn line can be replaced by pulling it back out or by reversing it back through the same outlet from which it was initially inserted. The design eliminates practically all of the costs associated with the current state of the art rapid loading mechanisms as there is no physical compression, gripping or biting into the line by any mechanical or moving mechanism. Additionally, the line is insertable in multiple orientations.

6 Claims, 18 Drawing Sheets

(56) References Cited

U.S. PATENT DOCUMENTS

| | | |
|---|---|---|
| 6,314,848 B2 | 11/2001 | Morabit et al. |
| 6,415,585 B2 | 7/2002 | Morabit et al. |
| 6,539,694 B2 * | 4/2003 | Oxley ................. A01D 34/003 56/12.7 |
| 6,715,270 B1 * | 4/2004 | Yandle, II .......... A01D 34/4166 30/276 |
| 6,827,152 B2 * | 12/2004 | Iacona ............................ 172/42 |
| 6,862,871 B2 | 3/2005 | Morabit et al. |
| 7,000,324 B2 * | 2/2006 | Fogle ................... A01D 34/416 30/276 |
| 2001/0003935 A1 * | 6/2001 | Morabit et al. .... A01D 34/4168 83/13 |
| 2002/0073556 A1 * | 6/2002 | Fogle .............................. 30/276 |
| 2004/0103543 A1 * | 6/2004 | Fogle ................. A01D 34/416 30/276 |
| 2006/0053636 A1 * | 3/2006 | Fogle ................. A01D 34/416 30/276 |
| 2006/0179663 A1 * | 8/2006 | Harris ................. A01D 34/416 30/276 |

\* cited by examiner

LINE LOADER FOR A GRASS TRIMMER

CROSS-REFERENCES TO RELATED APPLICATIONS

This application claims the benefit of U.S. Provisional Patent Application Ser. No. 61/109,039, filed Oct. 28, 2008 and U.S. Provisional Patent Application Ser. No. 61/144,561, filed, Jan. 14, 2009, the entire content of each of which is herein incorporated by reference.

STATEMENT REGARDING FEDERALLY SPONSORED RESEARCH OR DEVELOPMENT (NOT APPLICABLE)

BACKGROUND OF THE INVENTION

The invention relates to line loading for a rotating grass trimmer head and, more particularly, to grass trimmer heads and line loading schemes for easily and securely installing independent cutting blades in a desired orientation.

The invention is particularly suited for use with cutting blades including a non-circular or non-symmetrical cross-section, in particular an aerodynamic cross-section. With such cutting line, it is possible to achieve vastly improved cutting results as well as other advantages in vegetation cutting string, devices and methods. An exemplary vegetation cutter using such aerodynamic line is disclosed in U.S. Pat. No. 5,761,816, the disclosure of which is hereby incorporated by reference. Further examples and applications of cutting blades utilizing an aerodynamic cross-section are disclosed in U.S. Pat. No. 5,996,233, U.S. Pat. No. 6,161,292, U.S. Pat. No. 6,176,015, U.S. Pat. No. 6,314,848, U.S. Pat. No. 6,415,585, and U.S. Pat. No. 6,862,871, the disclosures of all of which are hereby incorporated by reference.

In the grass trimmer heads utilizing flexible monofilament lines or flexible line blades including symmetrical or non-symmetrical hinges, loading and/or replacing the individual cutting lines/blades can be burdensome, particularly in the field, since the lines are required to be adequately and independently secured in the trimmer head. Additionally, significant advantages can be achieved by varying the orientation of the aerodynamic cutting line depending on desired use. It would thus be beneficial to provide a trimmer head that can accommodate the line in multiple orientations so that different lines are not required for different uses.

Rapid line loader heads for grass trimmers (currently on the market) all require added mechanical mechanism(s) that self-lock conventional monofilament line only with physically moving component parts that 'compress' or 'bite' into the line segment as their frictional means for line retention within the head. Such heads are convenient and attractive when the trimmer user wants to avoid a complex and frustrating process when needing to replace worn trimmer line. These rapid loaders simplify the line replenishment process, which is often complicated by snarling bundles of snagged line, or if using precut lengths by having to repetitively replace worn out line, or having to remove component parts making the process further frustrating with numerous types of complex systems that jam when feeding or are otherwise very complex to wind and reload.

The precut line segment is inserted into an outlet and internally retained or gripped by the movement and squeezing of a rotating or sliding type of gripping mechanism. They generally involve a one way direction first through the outlet but upon the line's wearing out and needing replacement, it normally cannot be reversed back through the outlet unless its mechanical retainer is in some manner mechanically relocated or dislodged from its compressive grip on the line. If there is no reversing removal feature, the worn line must be pulled away from the gripping direction and more frequently toward the center of the head in the same general direction as it was first inserted into the head. The design of the head is therefore often compromised to require a large or interfering removal zone in another place (generally in the center of the head) other than the line outlet where the initial insertion was required. This causes the designer to limit the important provision for a ground supporting bubble or sliding curvature at the base of the head where it contacts the ground.

Additionally, the grippers will frequently allow the line to slip out for numerous potential reasons, thus disabling the desirable features and any further cutting/trimming because the line is forced out by centrifugal force or impacting loads during string cutting operations without being retained. The causes for lost grip are related to potential jamming, loss of spring force, loss of gripper sharpness, misalignment, foreign debris blocking the mechanism, friction preventing the needed movement of the mechanisms, excessive mass and high centrifugal forces onto the line, geometry of the line, and more.

Moreover, these heads are very costly because they require additional and multiple precision components that are costly themselves to manufacture and labor intensive to assemble into a final product. These precision parts have to be mounted to strong supporting posts or accurately preformed slots to assure their reliable gripping functions within the working mechanism.

Such mechanisms work for generally most symmetrical lines but are less capable in accepting and adequately gripping non-circular or otherwise non-symmetrical line shapes such as rectangular or asymmetrical sections such as, tear drop, or elliptical, etc. Additionally, such mechanisms do not allow insertion and retention means that will allow a desired orientation of a particular profile when the frontal curvature or cutting edges need to be directed along the general operational or cutting plane.

BRIEF SUMMARY OF THE INVENTION

The described embodiments include a top loading line blade and corresponding head that securely holds the cutting lines with multiple orientations of the line blade. An alternative embodiment provides a simplified loading scheme where a cutting line is loaded into the trimmer head from its outside, through a line outlet to a fixed receiver without the need for a moving or mechanical line gripping or biting type mechanism. With this construction, a worn line can be replaced by pulling it back out or by reversing it back through the same outlet from which it was initially inserted. The design eliminates practically all of the costs associated with the current state of the art rapid loading mechanisms as there is no physical compression, gripping or biting into the line by any mechanical or moving mechanism. Additionally, the line is insertable in multiple orientations.

In an exemplary embodiment, a grass trimmer head includes an internal post, a guide post, and an outlet opening with an exit hood, and a cutting line includes a cutting blade, a hinge portion, and a connecting portion. A method of installing the cutting line in the grass trimmer head includes the steps of (a) fitting the connecting portion of the cutting line over the internal post; (b) securing the hinge portion of the cutting line to the guide post, the hinge portion extending around the guide post, at least one of the internal post and the guide post including a hood portion, and wherein the hinge portion of the cutting line is positioned under the hood portion; and (c) further securing the hinge portion of the cutting line in the outlet opening and under the exit hood.

An entry slot may be defined between the outlet opening and the exit hood, and the cutting line may be shaped such that a width dimension is greater than a thickness dimension. In this context, step (c) may be practiced by twisting the hinge portion of the cutting line, sliding the twisted hinge portion through the entry slot, and turning the hinge portion under the exit hood.

In one embodiment, step (a) is practiced by orienting the grass trimmer head with the internal post facing upward, and top loading the connecting portion of the cutting line over the internal post. Step (b) may be practiced by guiding the hinge portion in a first direction around the guide post, then guiding the hinge portion in a second direction, different from the first direction, toward the outlet opening.

In another exemplary embodiment, a grass trimmer head includes retention structure for securing a cutting line. The grass trimmer head includes an internal post disposed within an outside diameter of the grass trimmer head. A guide post is spaced from the internal post, where at least one of the internal post and the guide post includes a hood portion. An outlet opening is spaced from the guide post and opens to an exterior of the grass trimmer head. An exit hood is disposed covering the outlet opening, where an entry slot is defined between the exit hood and the outlet opening.

The internal post may be T-shaped in plan view. In one embodiment, the internal post, the guide post, the outlet opening and the exit hood define an assembly slot that is shaped to receive the cutting line. In this context, the assembly slot includes curved side walls that guide the cutting line from the internal post, around the guide post and under the hood portion, and through the outlet opening.

In yet another exemplary embodiment, a method of installing a cutting line in a grass trimmer head that includes a line outlet, a channeled track and a fixed receiver includes the steps of (a) feeding the cutting line into the line outlet from outside the grass trimmer head; (b) guiding the cutting line along the channeled track; and (c) engaging a leading end of the cutting line with the fixed receiver, wherein the channeled track and the fixed receiver are without a moving or mechanical line gripping mechanism. The method may additionally include removing the cutting line when desired by extracting the cutting line from the line outlet in a reverse direction from the feeding step. The removing step may be practiced by manually displacing an end of the cutting line into a disengaged position, and subsequently removing the cutting line.

The grass trimmer head preferably includes a plurality of channeled tracks that respectively effect different orientations of the cutting line. In this context, steps (a) and (b) may be practiced by feeding and guiding the cutting line into a selected one of the plurality of channeled tracks according to a desired orientation of the cutting line.

In still another exemplary embodiment, a grass trimmer head includes a fixed line receiver shaped to receive and secure an inside end of a cutting line without a moving or mechanical line gripping or frictional type mechanism. A line outlet is provided, through which the cutting line is initially fed from outside the grass trimmer head. A channeled track is positioned between the line outlet and the fixed line receiver. The channeled track guides the inside end of the cutting line from the line outlet to the fixed line receiver.

The inside end of the cutting line may include a head section having a first width and a neck section having a second narrower width, where the fixed line receiver may include fork tines that are spaced apart a distance narrower than the first width and wider than the second width.

In one embodiment, the gas trimmer head includes a plurality of channeled tracks that respectively effect different orientations of the cutting line.

In yet another exemplary embodiment, a combination grass trimmer head and cutting line includes a fixed line receiver in the grass trimmer head shaped to receive and secure an inside end of the cutting line without a moving or mechanical line gripping mechanism; a line outlet in the grass trimmer head through which the cutting line is fed from outside the grass trimmer head; a channeled track in the grass trimmer head between the line outlet and the fixed line receiver, the channeled track guiding the inside end of the cutting line from the line outlet to the fixed line receiver. The cutting line includes a cutting blade having a non-circular or non-symmetrical cross-section. Preferably, the inside end of the cutting line is tapered on one side. The cutting line may be provided with a plurality of spade segments at spaced locations along the cutting line to enable different outlet cutting lengths or cutting swath diameters.

BRIEF DESCRIPTION OF THE DRAWINGS

These and other aspects and advantages will be described in detail with reference to the accompanying drawings, in which.

DETAILED DESCRIPTION OF THE INVENTION

Figure 1:
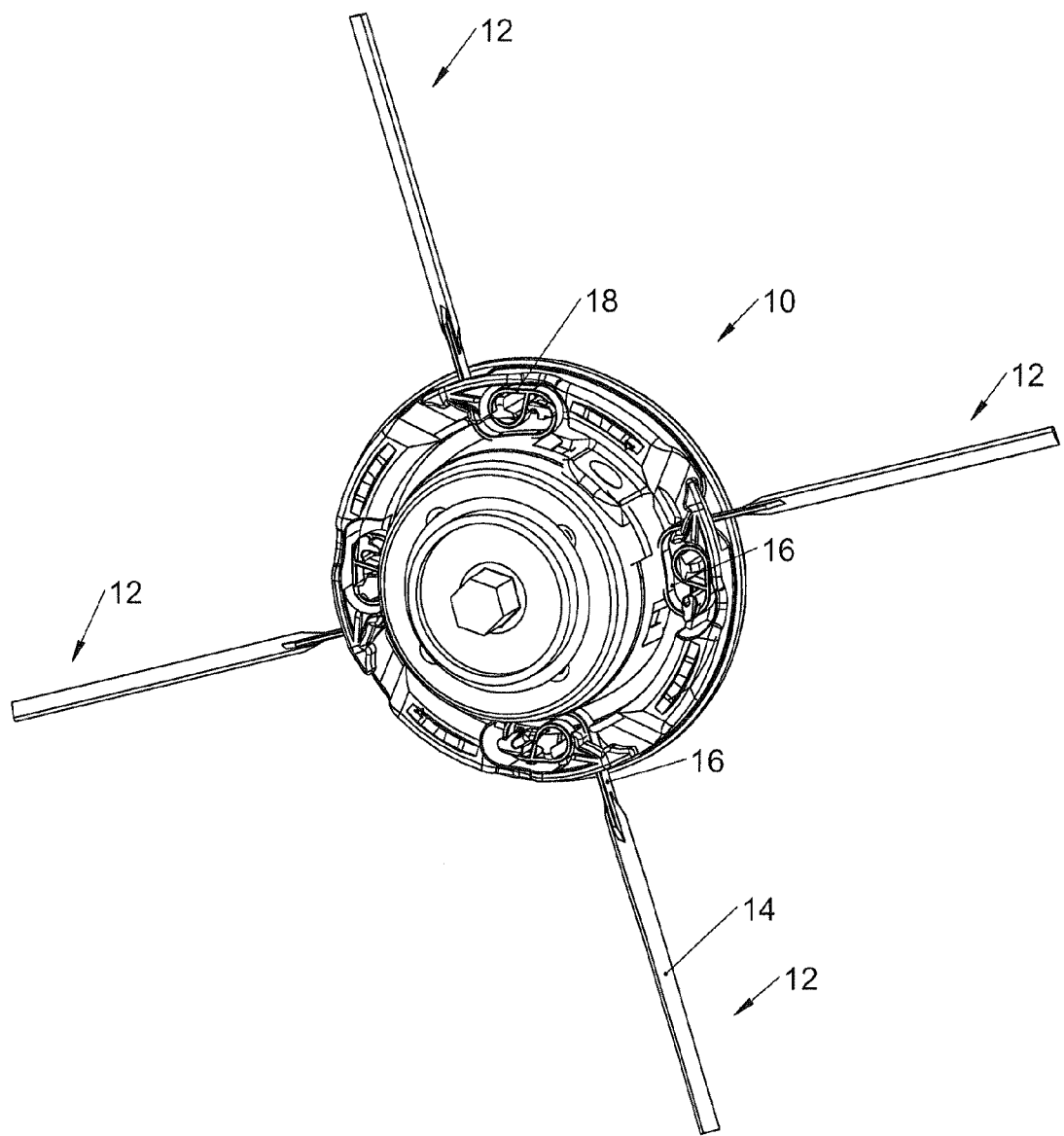
FIG. 1 is a perspective view of an exemplary top load design.
Figure 2:
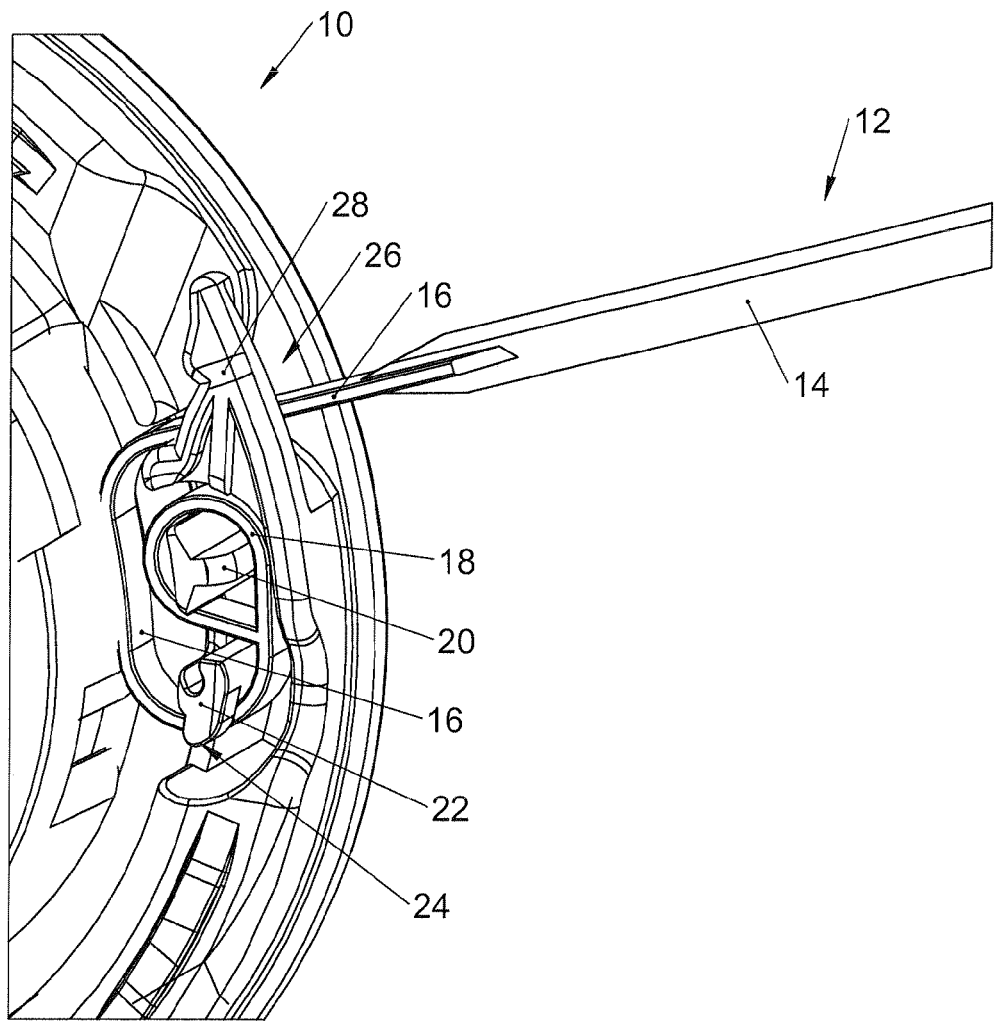
FIG. 2 is a close-up view of the top load retaining structure shown in FIG. 1.

With reference to FIGS. 1 and 2, in a first embodiment, the top loading line blade is shown. The phrase "top loading" refers to the manner in which the cutting blades are loaded with the retaining structure in the trimmer head facing upward. FIG. 1 shows an exemplary trimmer head 10 securing four independent cutting lines 12. As noted, it is preferable that the cutting lines 12 are flexible monofilament lines or flexible line blades with a cutting surface having a non-circular or non-symmetrical cross-section, preferably an aerodynamic cross-section as described in the above-noted patents.

Each cutting line 12 includes a cutting blade 14, a hinge portion 16, and a connecting portion 18. In order to install the cutting line 12 in the grass trimmer head 10, the connecting portion 18 is initially fit over an internal post 20, which as shown is disposed within an outside diameter of the trimmer head 10. The hinge portion 16 of the cutting line is extended around a guide post 22. In the embodiment shown in FIG. 2, the guide post 22 includes a hood portion 24 that prevents the cutting line 12 from being dislodged from the trimmer head 10. The hinge portion 16 is guided to an outlet opening 26 which is covered by an exit hood 28.

An entry slot is defined between the outlet opening 26 and the exit hood 28. In a preferred installation method, the cutting line 12 is secured in the outlet opening 26 under the exit hood 28 by twisting the hinge portion 16 and sliding the twisted hinge portion through the entry slot. Subsequently, the hinge portion is turned back to its natural orientation and positioned under the exit hood 28. By securing the line in this manner, particularly under the hood portion 24 and exit hood 28, the line 12 is retained from escaping the assembly slot during its dynamic operation when grass trimming.

The slot or channel in which the hinge portion 16 of the cutting line extends is formed between an upper roof and a lower base of the trimmer head 10. The sides of the assembly slot define a naturally curved line blade retainer as shown to capture the line within the outlet cavity (below the exit hood 28 and above the base of the trimmer head beyond the assembly slot path). With the twist/slide/turn installation method under the exit hood 28, the line is contained within the outlet slot 26 by the exit hood 28 and the base (bottom of the outlet slot). This enables easy loading and eliminates the need for springs or friction type (gripping) teeth or mechanisms as utilized in current state of the art rapid loaders and the like.

The channel or slot that receives the cutting line, in particular the hinge portion 16 can be oriented for added security if needed using a "zig-zag" orientation or including additional ribs as needed for retention of the cutting line. Preferably, there are at least two retaining hoods, including one internally within the head 10, and the exit hood 28 at the outlet for each line segment to keep the line contained within its intended cutting plane. As shown in FIG. 2, the hood portion 24 is formed as part of the guide post 22. The internal or inner hood(s) can be anywhere conveniently or more effectively positioned for convenience or to favor the molding process. Shapes of the internal retaining structure can also vary, using multiple loops, posts, bends, turns, etc. (some configurations of which are described in the above-noted patents). Also, the exit hood 28 may be configured as an exit tunnel hood that is without an open slot. With this structure, the line may be guided through the tunnel hood from the interior.

Figure 3A:
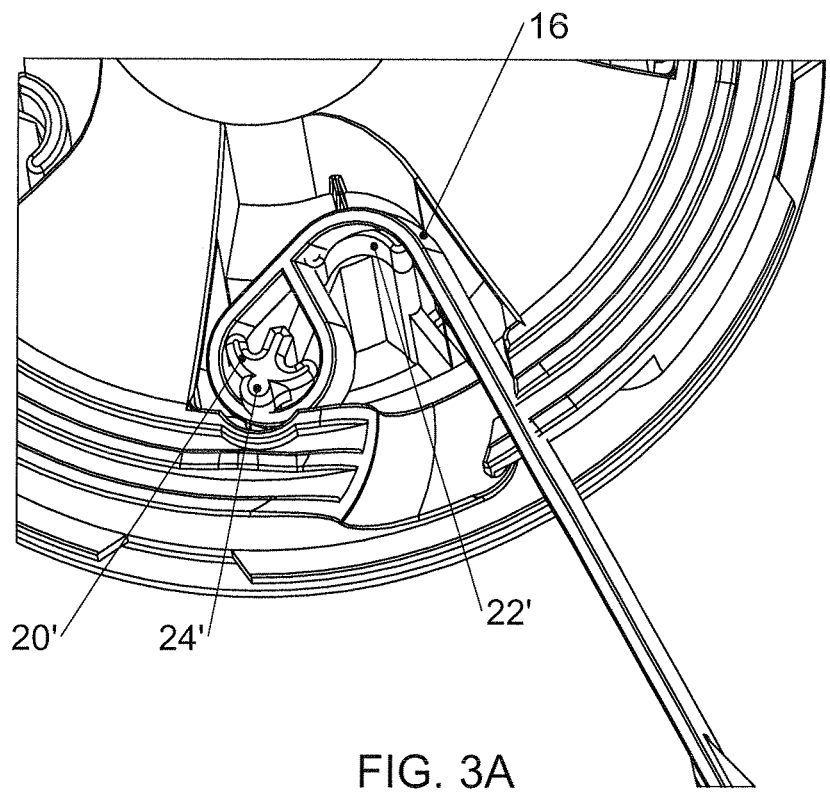
FIGS. 3A-3D show an insertion process for an alternative top load embodiment.
Figure 3B:
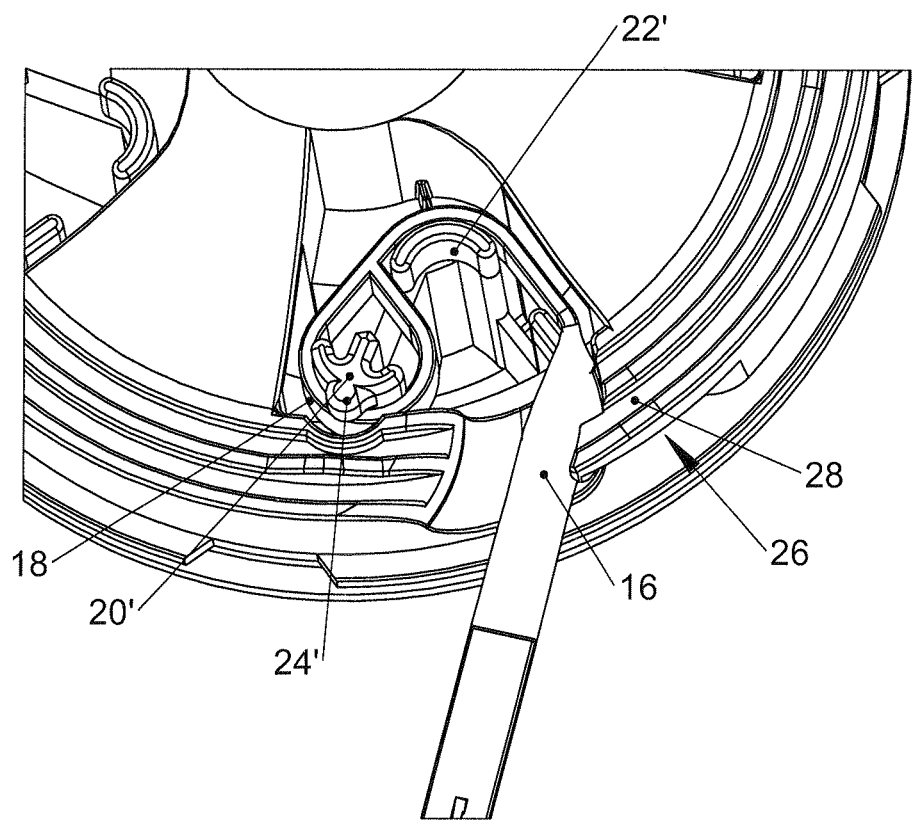
Figure 3C:
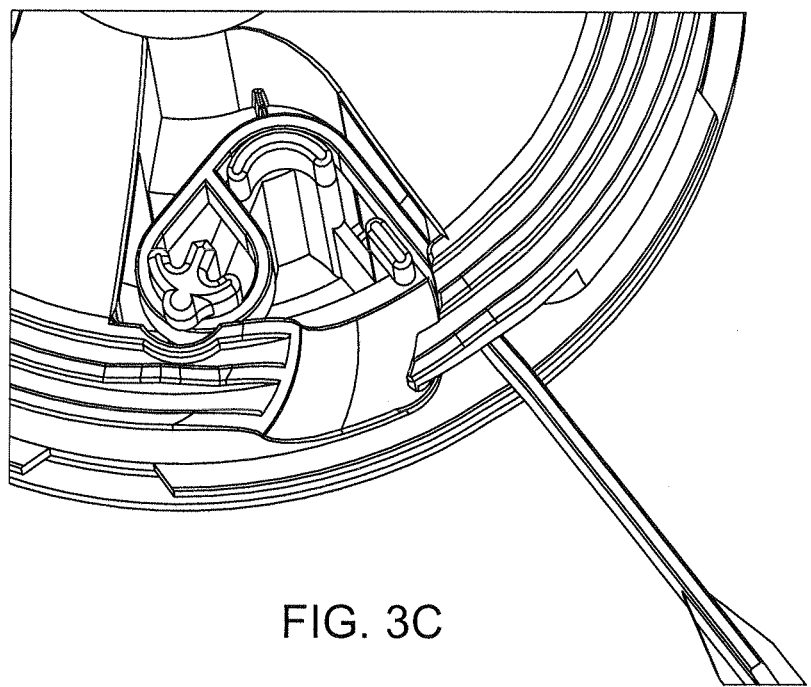
Figure 3D:
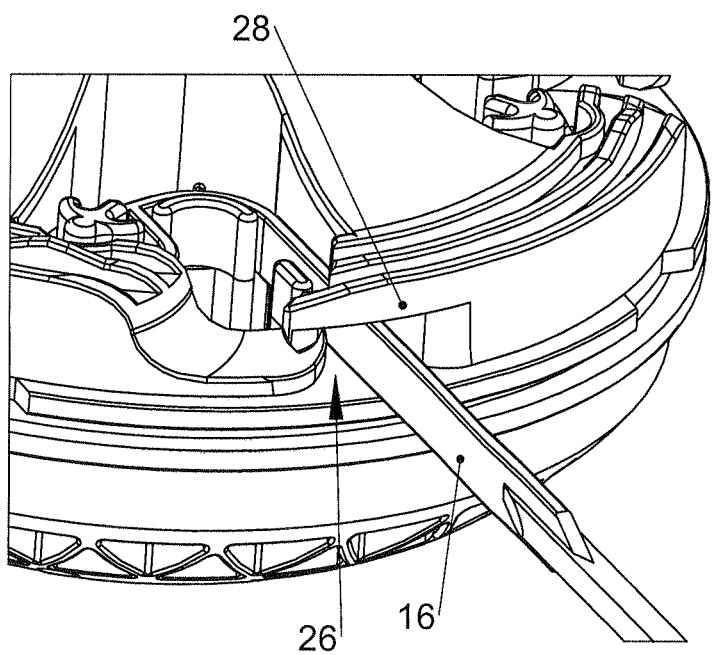

FIGS. 3A-3D show an insertion method utilizing an alternative construction. In this embodiment, the hood portion 24' forms part of the internal post 20', and the hinge portion 16 of the cutting line is subsequently guided around a guide post 22'. As shown in FIG. 3B, after the connecting portion 18 of the cutting line is secured over the internal post 20' and under the hood portion 24', the hinge portion 16 is guided around the guide post 22' to the outlet opening 26. The hinge portion 16 is twisted as shown in FIG. 3B and slid through the entry slot between the exit hood 28 and the outlet opening 26. The hinge portion 16 is then turned back to its natural orientation under the exit hood 28 as shown in FIG. 3D.

In still another configuration (not shown) similarly using the twist/slide/turn loading method, with the cutting lines installed, the trimmer head 10 is connected to a base head receiver with finger tab snaps or the like (base receiver head presses against lines holding them from falling out). The cap and base head receiver are multi-directional (clockwise or counterclockwise). With the lines retained in the cap, the cap is assembled and turned left or right beyond a rotational snap into the base receiver. Preferably, the cap is assembled and turned left for counterclockwise rotation and right for clockwise rotation.

The advantage of this construction is to pre-load the cap with line blades using the dual hood twist/slide/turn method before connecting the pre-loaded head to the base receiver already assembled to the trimmer. This will also allow different sized/optional functioning line blades for specialized use with quick and convenient change-over options that may utilize technological features of the aerodynamic line as described in the above-noted patents such as updraft, downdraft, special edging, mowing, mulching, heavy weed hogging, etc.

Figure 4A:
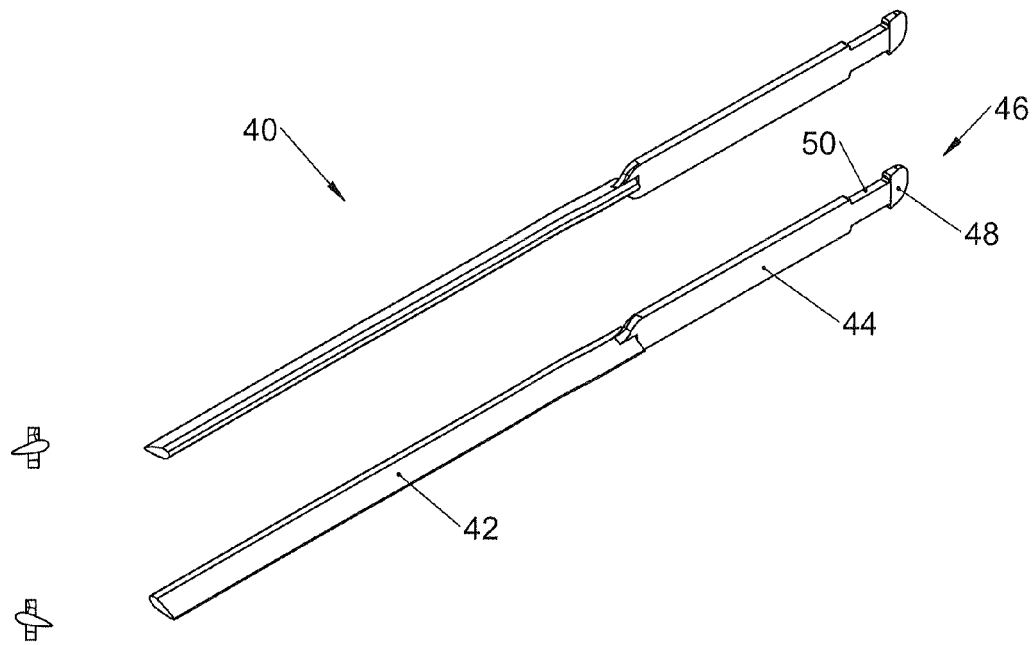
FIGS. 4A and 4B show exemplary configurations of the cutting lines/blades.
Figure 4B:
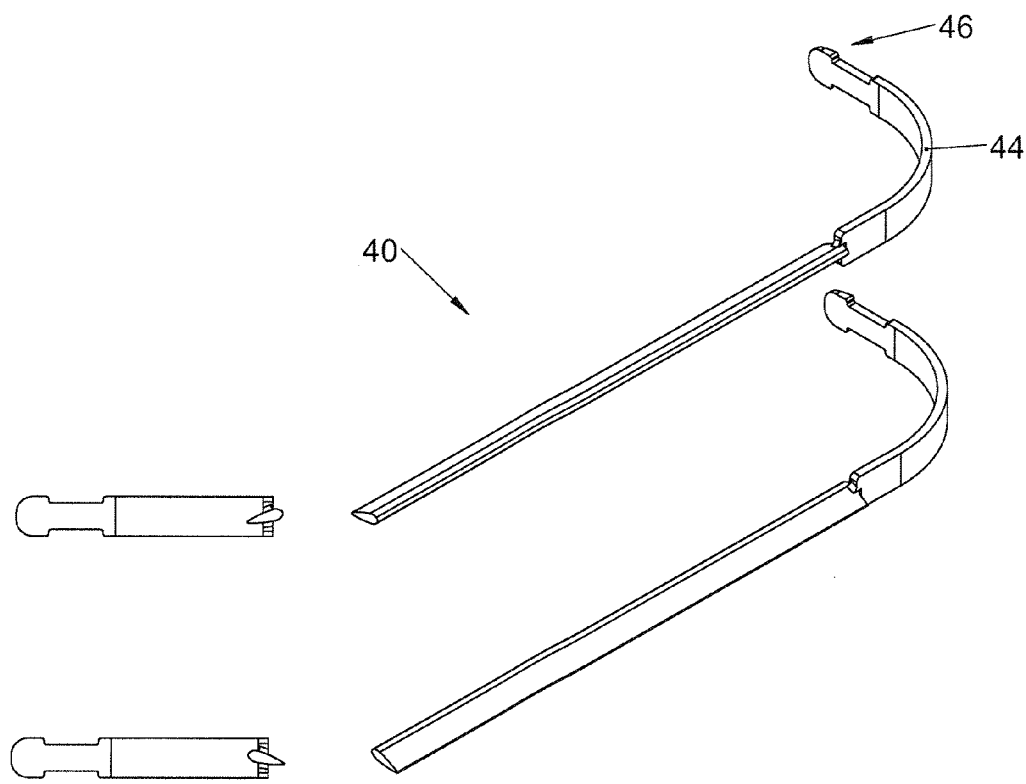
Figure 5:
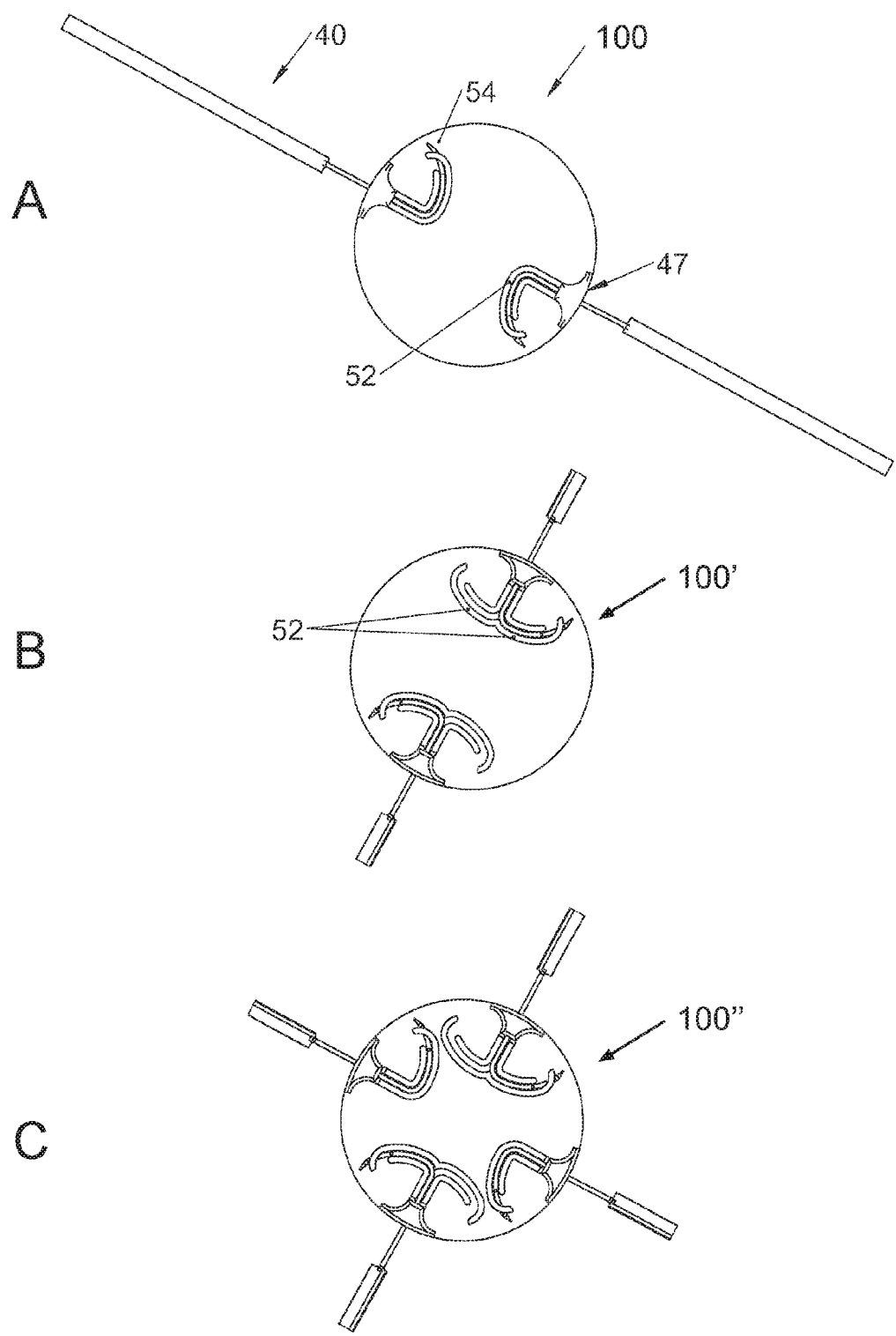
FIGS. 5A-5C show exemplary alternatives with single and dual tracks.
Figure 6:
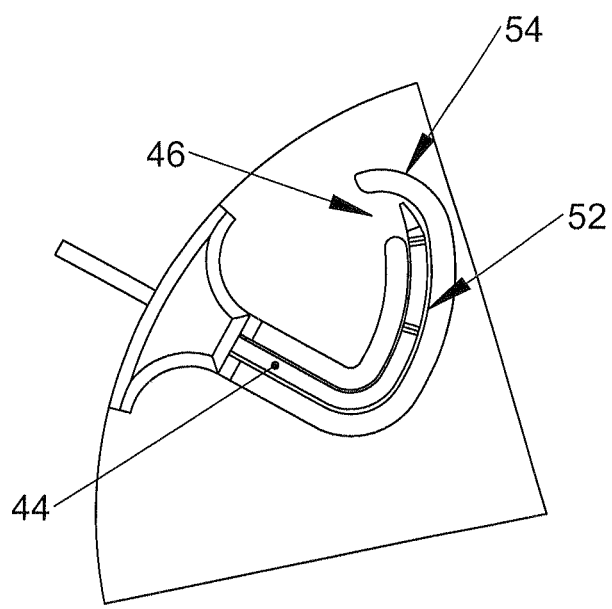
FIG. 6 is a close-up view of a channeled track.

A second embodiment and line loading methodology will be described with reference to FIGS. 4A-14B. FIGS. 4A and 4B show exemplary cutting lines/40 according to the second embodiment. The cutting lines 40 include a cutting blade 42, a leader section 44, either straight or curved, and a spade leader or leading/inside end 46. As shown in FIG. 4B, a natural bend helps as a self-guide for the line to find its way into the direction of the desired (right or left) track or wherever located. The leading or inside end 46 of the cutting line 40 includes a head section 48 having a first width and a neck section 50 having a second width, which as shown in FIGS. 4A and 4B is narrower than the first width.

In this embodiment, simplified and secure loading of a cutting line enables the cutting line to be inserted into a line outlet 47 from outside a trimmer head 100. The leading end 46 of the cutting line 40 is guided through a channel track 52 that guides the line to a fixed receiver 54 (of any conceivable matching shape) without the need for a moving or mechanical line gripping or biting type mechanism.

Figure 7A:
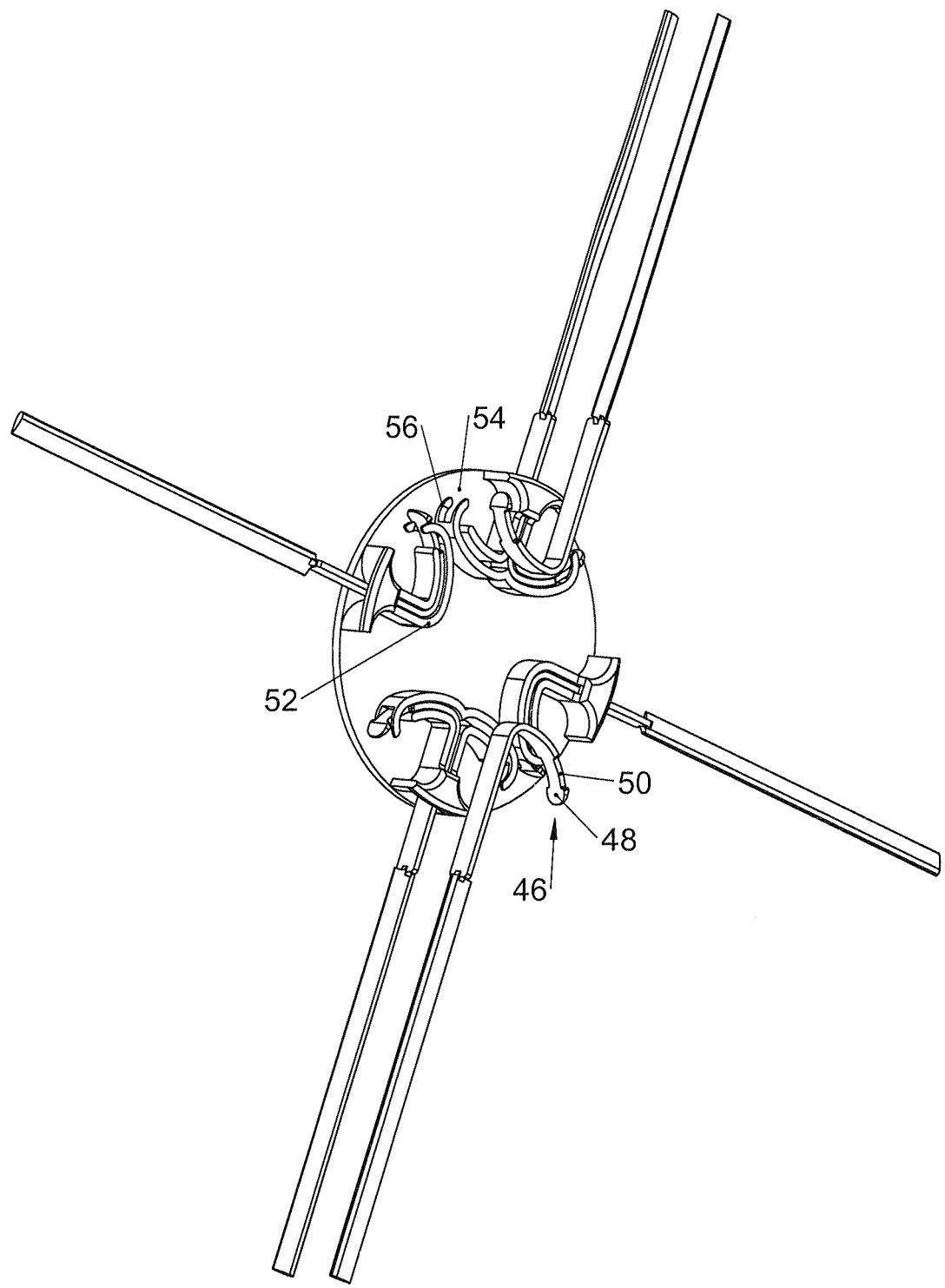
FIG. 7A is a perspective view showing the cutting blades inserted in the trimmer head.
Figure 7B:
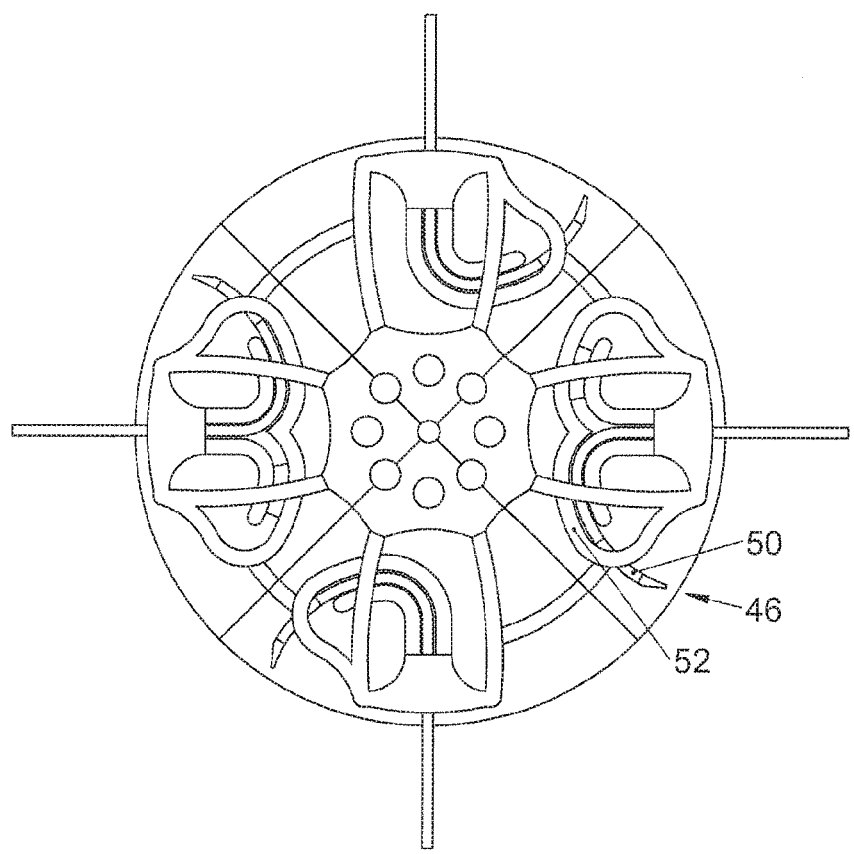
FIGS. 7B and 7C show an exemplary configuration of the trimmer head.
Figure 7C:
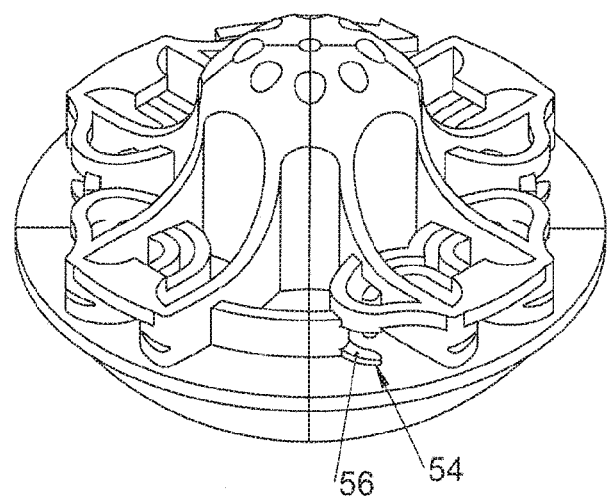
Figure 8:
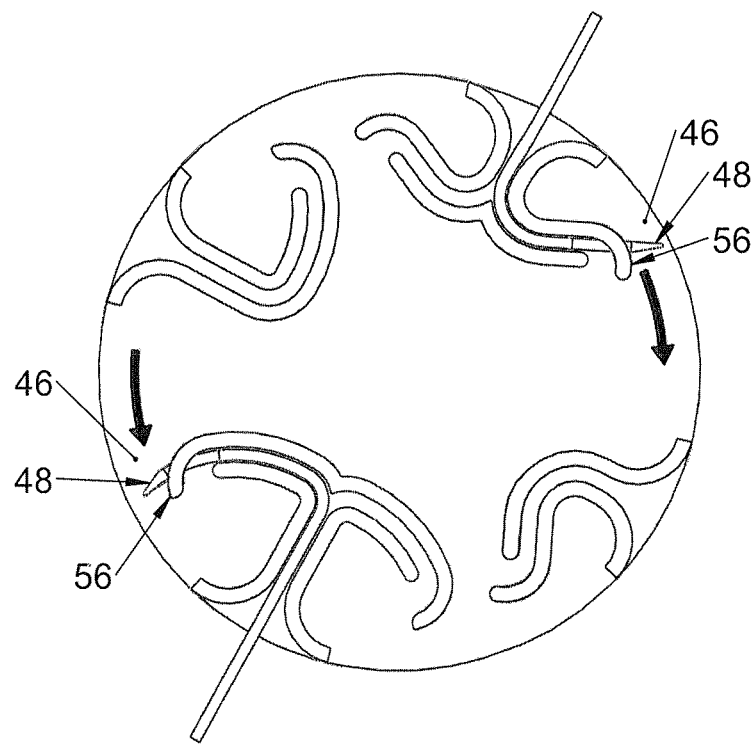
FIG. 8 shows how to release the cutting blades from the trimmer head.
Figures 9A, 9B:
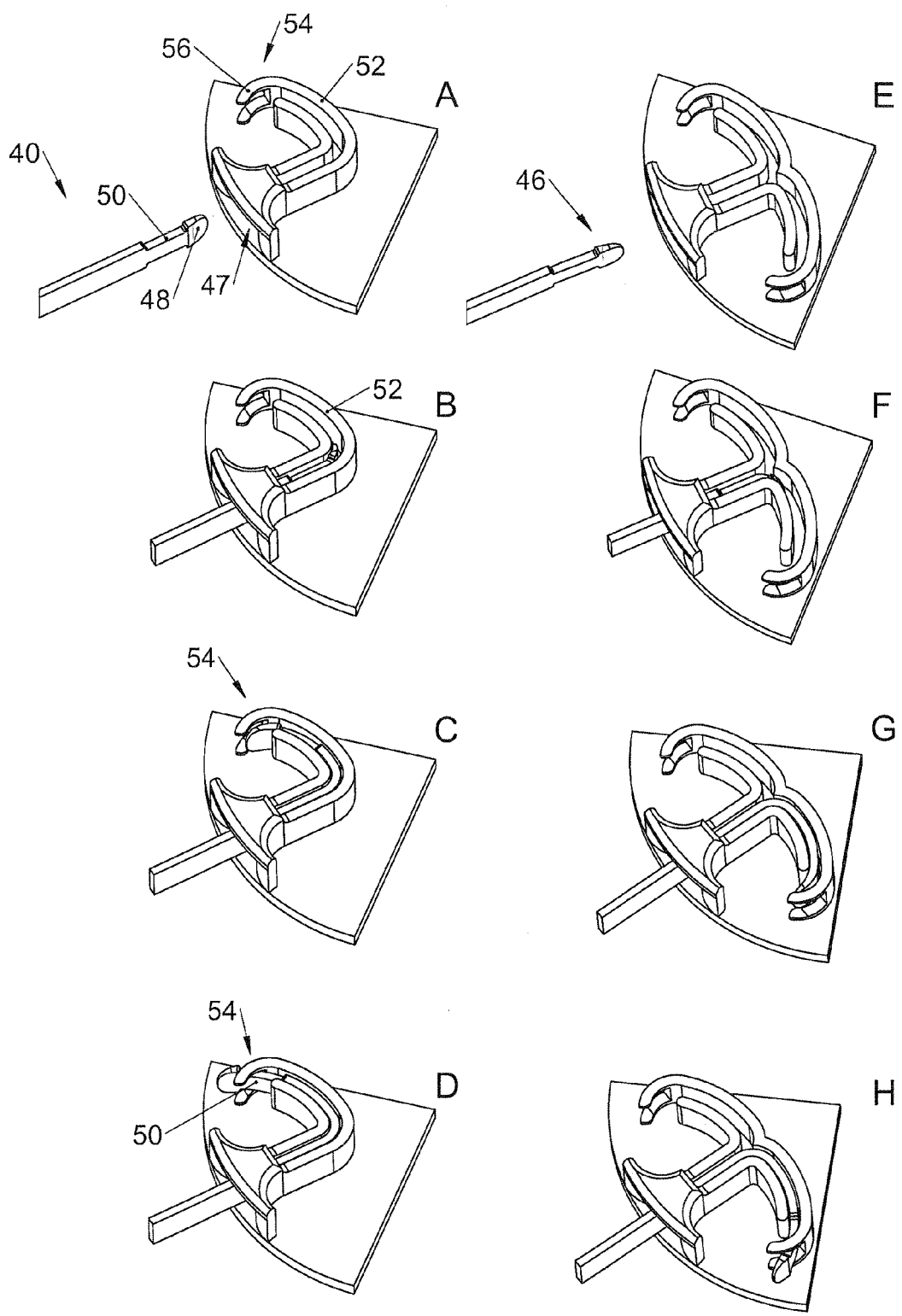
FIGS. 9A and 9B illustrate the process for inserting the cutting line in the trimmer head.

With reference to FIGS. 7A-7C and 8, the fixed line receiver 54 is shaped to cooperatively engage the inside end 46 of the cutting line. In a preferred embodiment, the fixed line receiver 54 includes a pair of fork tines 56 that are spaced apart by a distance wider than a width of the neck section 50 of the cutting line and narrower than the width of the head section 48 of the cutting line. With reference to FIGS. 9A and 9B, the cutting line 40 is fed into the line outlet 47 from outside the grass trimmer head (see A and E). The cutting line 40 is guided along the channeled track 52 (see B and F). As the cutting line is guided along the channeled track 52, the leading end 46 of the cutting line engages the fixed receiver 54. As the head section 48 is extended passed the fixed receiver 54 (see C and G), the neck section 50 falls between the tines 56 of the fixed receiver 54 to secure the cutting line in place (see D and H). Preferably, the head section 48 is tapered to facilitate installation of the cutting line such that the tapered portion is guided between the tines 56 of the fixed receiver 54.

When it is desired to remove the cutting line, the cutting line is extracted from the line outlet in a reverse direction. That is, in order to remove the line, as shown in FIG. 8, the internal end 46 of the cutting line is manually displaced so that the head section 48 is brought out of engagement with the tines 56 of the fixed receiver 54. Alternatively, the line and head may be constructed so that the cutting line is removable without a manual displacement. With the head section 48 disengaged from the fixed receiver 54, the cutting line can be removed along the same path in which the line was inserted. As shown in FIG. 8, the manual force or finger releasing force is preferably conveniently directed toward the head outlet, but alternatively could be directed away from the outlet where the line insertion originally started.

With this structure, there are no moving parts in order to retain the line (i.e., no springs, cams, grippers, sliders, etc.). The design eliminates practically all of the costs associated with the current state of the art rapid loading mechanisms. Additionally, there is no physical compression, gripping or biting into the line by any mechanical or moving mechanism.

Figure 11:
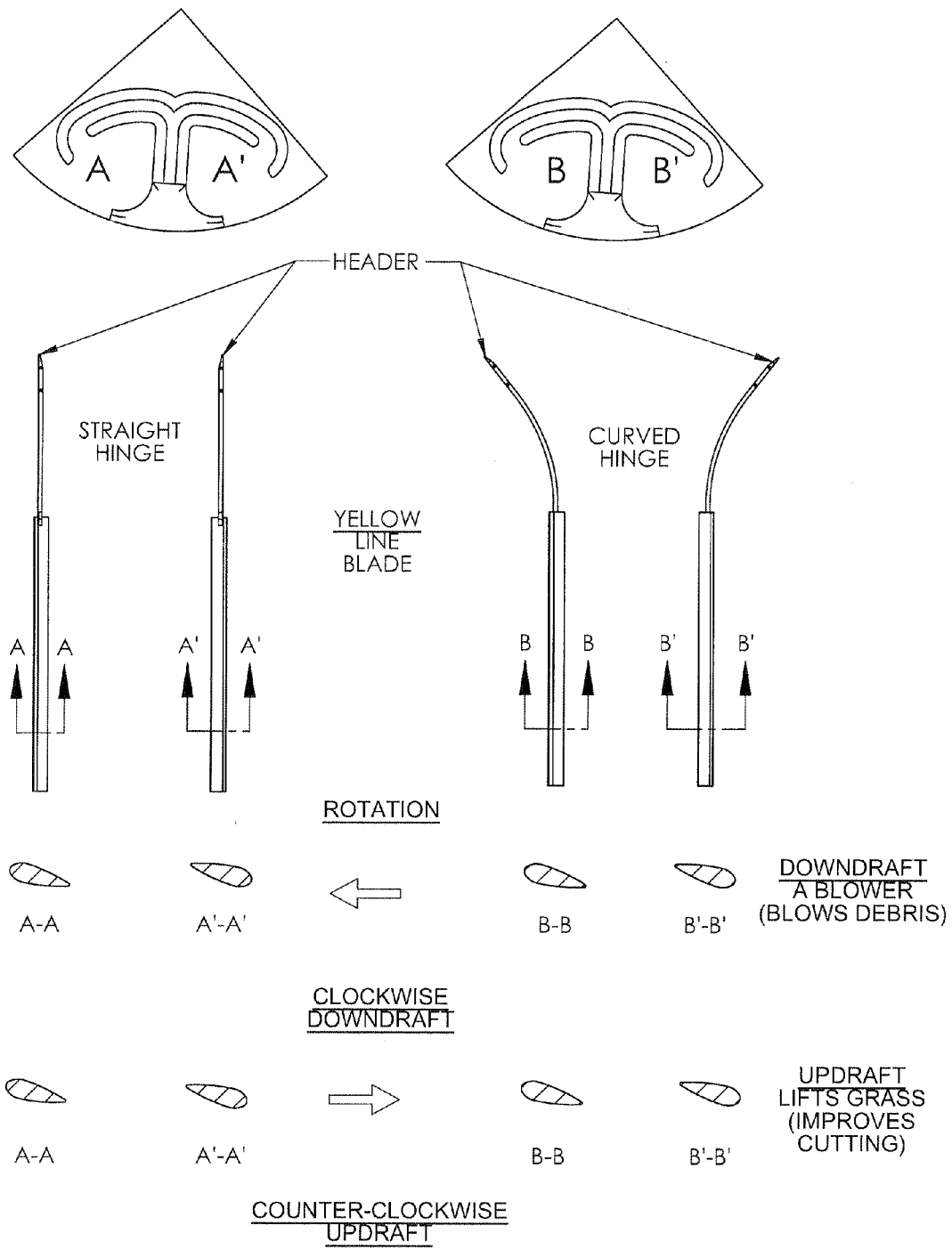
FIGS. 11-13 show various orientations and effects for the aerodynamic cutting line.
Figure 12:
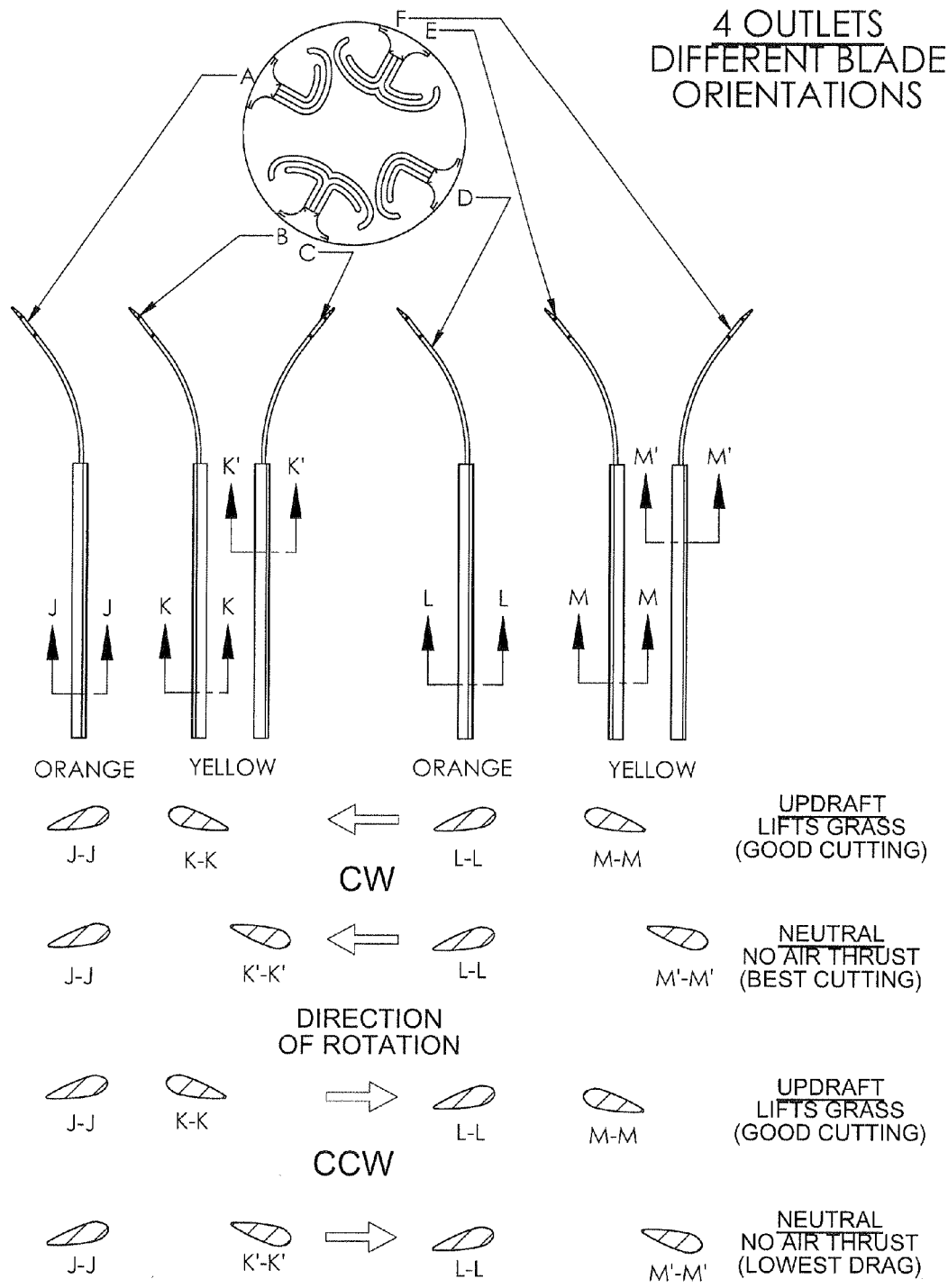
Figure 13:
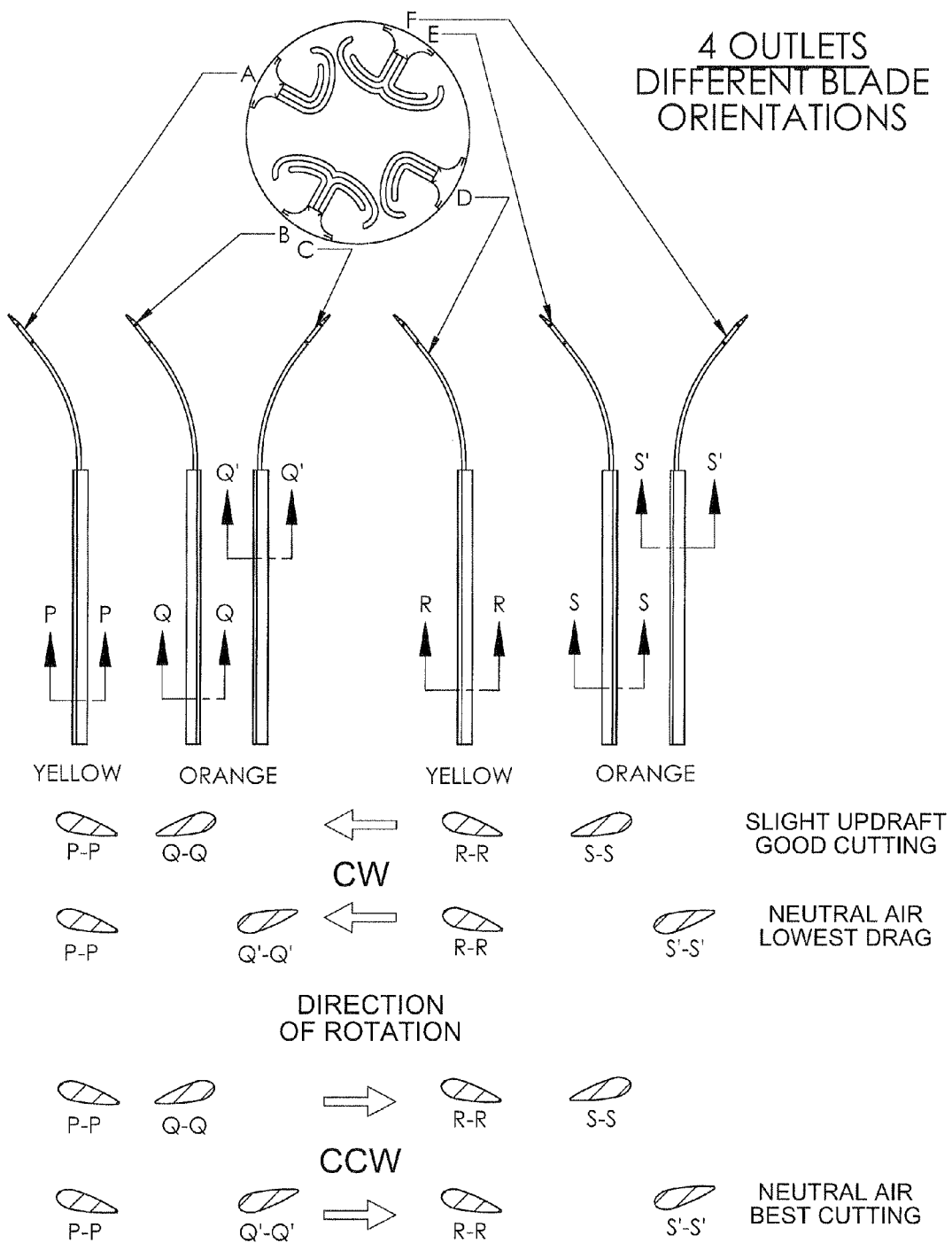
Figure 14A:
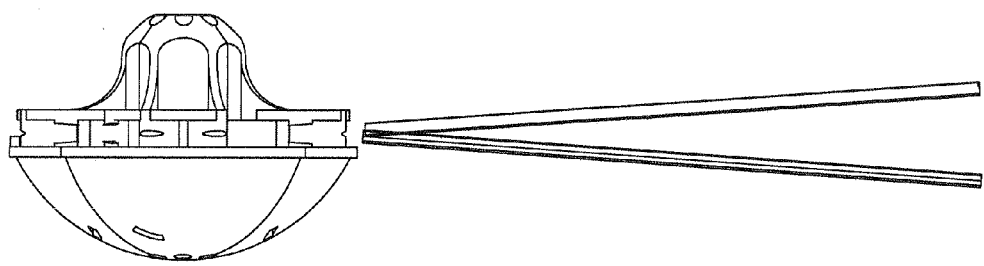
FIGS. 14A and 14B show an exemplary trimmer head with the cutting lines installed.
Figure 14B:
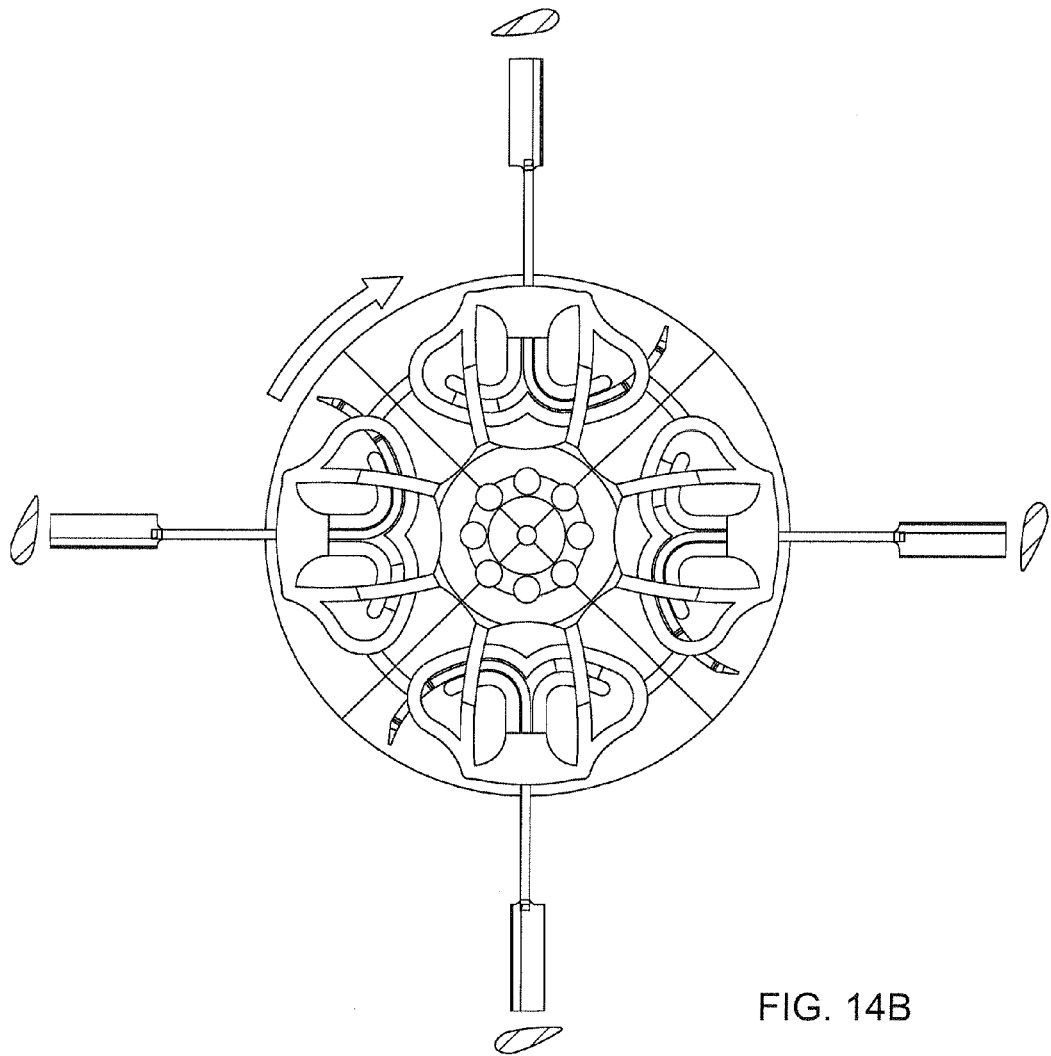

The trimmer head 100 can be configured with a plurality of channeled tracks 52 that respectively effect different orientations of the cutting line 40. See, for example, FIGS. 5A-5C. As shown, the trimmer head 100, 100', 100" can be provided with single tracks, dual, multiple tracks or combinations, respectively. FIGS. 7B-7C show an exemplary trimmer head including combination dual tracks and single tracks. FIGS. 11-13 show exemplary configurations of blade orientations to effect different blade functionality. For example, orientations may be varied to change the cutting line leading cutting edges. Alternatively, the orientation may vary the angular pitch for updraft, downdraft or neutral draft (no draft) depending on the trimmer head direction of rotation. Still further, the orientations may be varied to effect different aerodynamic line features and properties (e.g., low drag, low noise, etc.). The orientations may still further be varied to operate without air moving thrusts to the trimmer (i.e., neutral draft). The receiver tracks can be visually apparent from the outside viewer or covered by the design.

Figure 15:
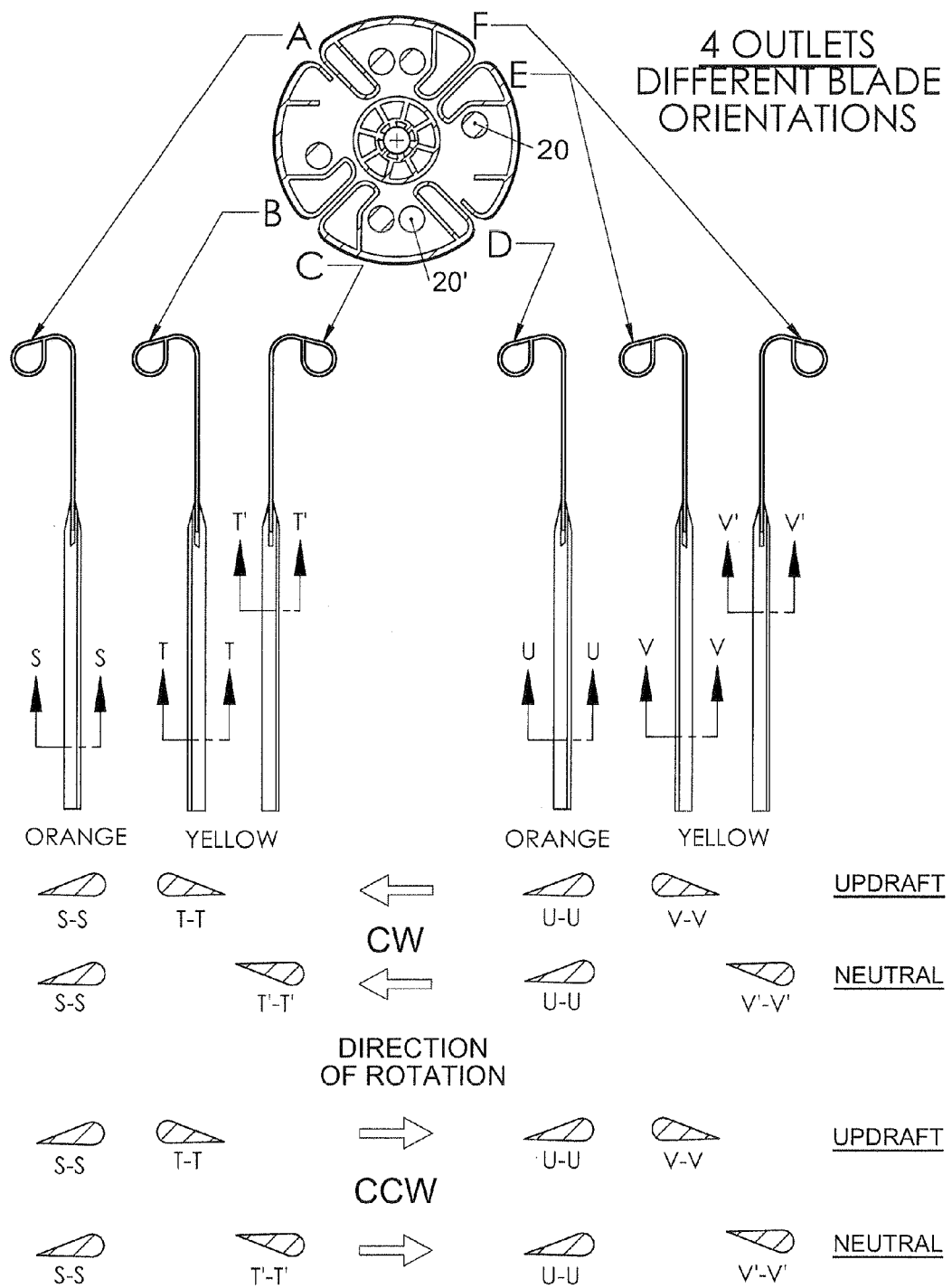
FIGS. 15 and 16 show various orientations of the cutting line for the top loading line blade embodiment.
Figure 16:
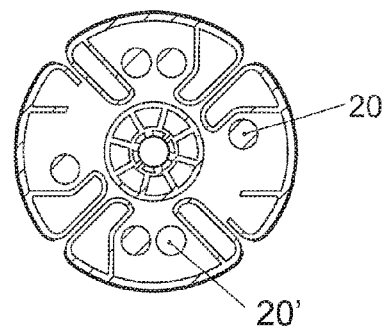
Figure 16:
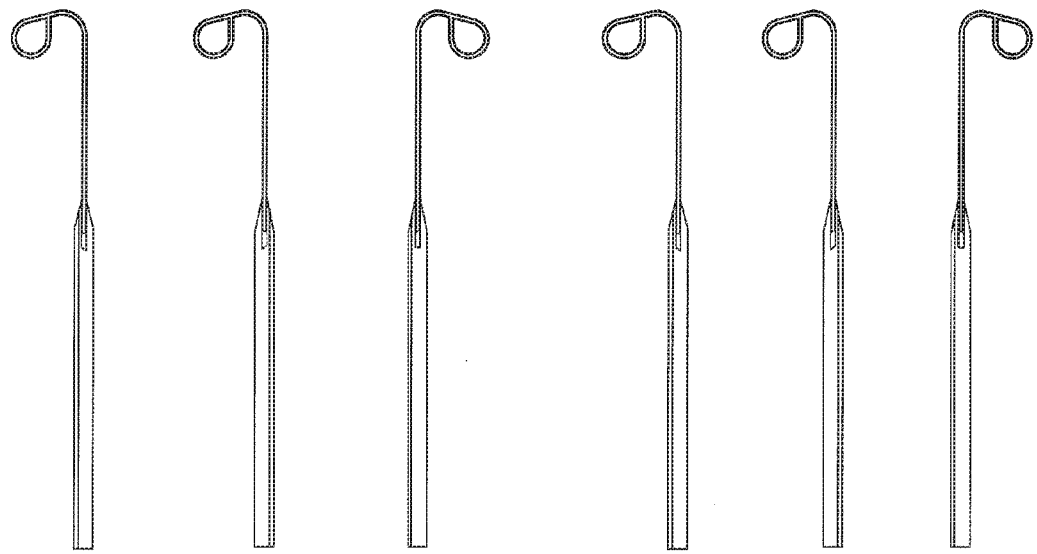
Figure 16:
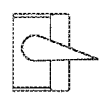
Figure 16:
Figure 16:
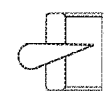
Figure 16:
Figure 16:
Figure 16:
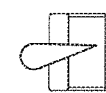

With reference to FIGS. 15 and 16, the same principles can be applied to the top load construction of the first embodiment. As shown, additional internal posts 20' can be added so that the cutting lines can be installed in forward or backward orientations. By mixing and matching various orientations and cutting line constructions, multiple configurations can be obtained that effect varying trimming characteristics.

As shown in FIG. 9A, the channelled track 52 is preferably provided with a minimum radius of curvature to reduce at least 75% of the tensile force (at the outlet 47) as applied to the line where it joins with the forked or matching receiver 54.

Figure 10A:
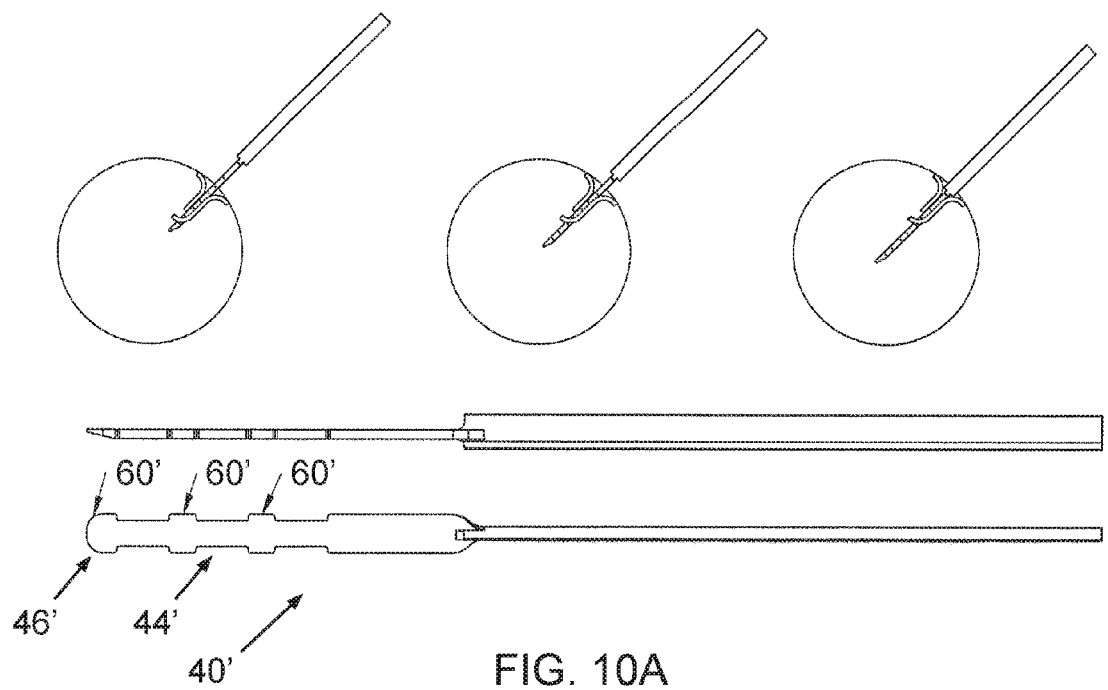
FIGS. 10A and 10B show an embodiment of the cutting line including multiple receiver positions to vary a cutting length of the cutting blade.
Figure 10B:
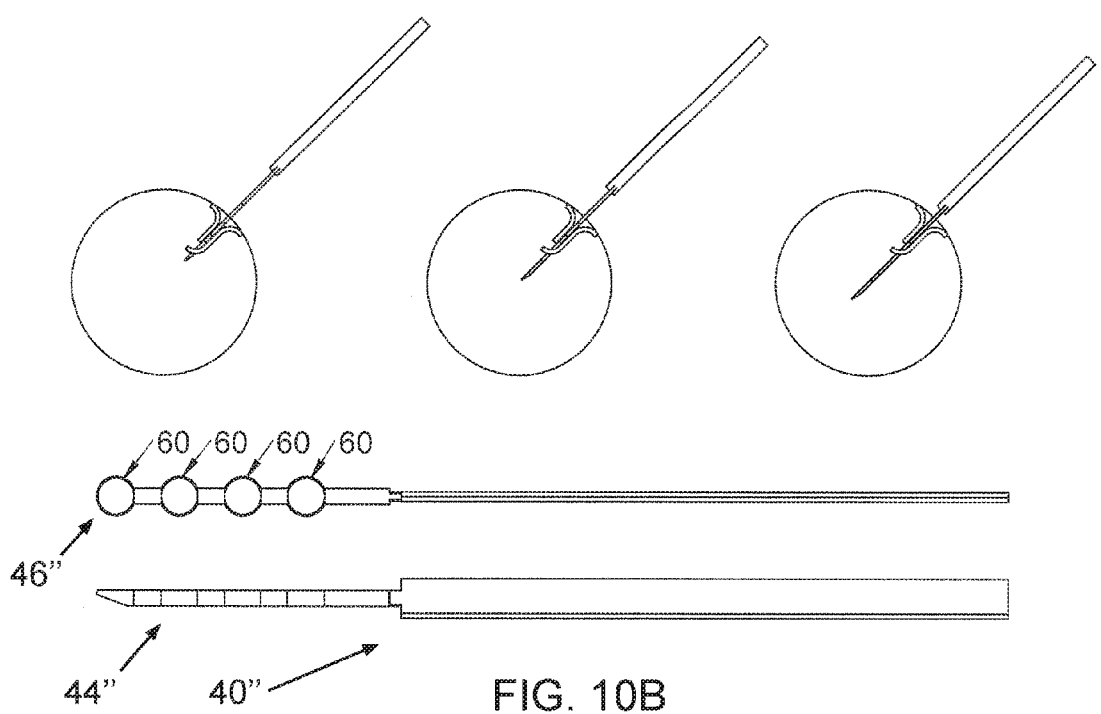

As shown in FIGS. 10A and 10B, the leader 44', 44", which includes the leading end 46', 46" of the cutting line 40', 40", may be provided with multiple receiver locating spade segments 60', 60" to enable different outlet cutting lengths as desired. FIGS. 10A and 10B show alternative constructions of the cutting line 40', 40" with the multiple receiver locating spade segments 60' 60".

The series of optional line blade geometrical shapes, relative positions and/or orientations enables a more desirable leading edge option for lowest aerodynamic drag. Additionally, the varying orientations can provide for sharper cutting edges, or for updraft to lift grass for a clean rotary mower type cut. The orientations may provide for downdraft for useful blowing away of grass clippings or for neutral draft to achieve additional drag reduction or to reduce air thrusting forces to the trimmer for achieving better operational control or still further for lowest noise levels during operation.

In a preferred application, the cutting lines from the above-noted patents can be utilized that incorporate a blade design with the most efficient (lowest drag) "tear drop" cross-section depending on direction of rotation. Some trimmers turn clockwise (when viewing down to the head from the operator's position), while others turn counter-clockwise. The noted line blades have an aerodynamic or fairly blunt/round side as a leading edge into the forward direction, and a sharp side often preferred for best cutting capability. By selecting the combination of cross-sectional profiles and when utilizing various optional loading tracks, any number of selections can result for the specifically desired purposes such as lowest aerodynamic and grass drag, best cutting dynamics, best air draft (up, down, neutral), best control of trimmer without thrust, and more benefits to include noise reduction, lower line blade speeds, or even higher line blade speeds for best cutting of much heavier vegetation.

The line blades can be injection molded or otherwise formed with the noted features incorporated. The design can also be applied to symmetrical lines by providing an auxiliary section containing the above-mentioned spade segment formed with or attached to the particular line profile. The attachment means could be via ultrasonic welding or an accepted industry practice for bonding two or more plastic materials.

In yet another variation on line blade orientation, the line blades can be provided with alternating orientations to push air up and down. See, for example, FIGS. 14A and 14B. With alternately pitched lines, there is thrust from the upward or downward air onto the flexible line. This in turn establishes an upper and a lower cutting plane. The cutters can be assembled into the desired receiver and pitched so that the lower cutters lift and cut the grass and move the longer clippings upward into the second plane of cutters pitched and thrusting upwards. This provides an additional and favorable method of mulching the grass clippings between the two line blade planes for better decomposition or mulching. Preferably, the gap created by the upper and lower planes is about 0.25"-0.50" for a 14" swath that uses four alternately mounted line blades.

Still further, there is an additional advantage to trimming without upper or downdraft air via alternately configuring and orienting the line blades to cancel out each other's air flow. This results in improved air drag reduction and the elimination of up or downward thrusting forces. Therefore, the trimmer head does not tend to thrust upward or downward (depending on the air flow direction), thus adding a degree of trimmer control when needed around delicate plantings.

This technology teaches a whole new methodology in trimmer heads and line loading that uses aerodynamically or variably shaped and designed line blades for better vegetation cutting and management. Each of the multiple options mentioned above creates a new method or unique technique that broadens the function and the range of use of the grass trimmer as we know it today to do more things than ever before. The new technology builds on the basic features of the prior patented line blade technology of specially shaped aerodynamic profiles that are oriented and maintained into a desired leading direction.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. In combination, a grass trimmer head and a cutting line mounted to the grass trimmer head, comprising:
   a fixed line receiver in the grass trimmer head that receives and secures an inside end of the cutting line without a moving gripping mechanism;
   a line outlet in the grass trimmer head from which the cutting line extends and through which, during insertion, the cutting line is fed from outside the grass trimmer head in a radially inward insertion direction;
   a channeled track in the grass trimmer head between the line outlet and the fixed line receiver through which the cutting line extends, the channeled track guiding the inside end of the cutting line, during insertion, from the line outlet to the fixed line receiver in the insertion direction, wherein the channeled track has a constant width between the line outlet and the fixed line receiver, and wherein the width of the channeled track is narrower than a width of a radial outer end of the line outlet, the line outlet and at least a portion of the channeled track being aligned and oriented radially along a line that intersects a central axis of the grass trimmer head,
   wherein the cutting line comprises a cutting blade having a non-circular or non-symmetrical cross-section,
   wherein the fixed line receiver, the line outlet and the channeled track cooperate with the cutting line such that the inside end of the cutting line is freely displaceable in and through the channeled track in a removal direction, opposite from the insertion direction, when the inside end of the cutting line is deflected from the fixed line receiver, and wherein widths of the cutting line at the inside end that engages the fixed line receiver and at portions that extend through the channeled track are narrower than widths of the line outlet and the channeled track, and
   wherein the inside end of the cutting line comprises a head section having a first width and a neck section adjacent the head section having a second narrower width, and wherein the fixed line receiver comprises fork tines that are spaced apart a distance narrower than the first width and wider than the second width and receive the neck section of the cutting line.

2. The combination according to claim 1, wherein the inside end of the cutting line is tapered.

3. The combination according to claim 1, wherein the cutting line comprises a plurality of spade segments at spaced locations along the cutting line to enable different outlet cutting lengths.

4. The combination according to claim 1, wherein the channeled track comprises a plurality of tracks that respectively effect different orientations of the cutting line.

5. The combination according to claim 1, wherein the channeled track is curved radially inwardly of the radially oriented portion thereof.

6. The combination according to claim 1, wherein the fixed line receiver is separate from the channeled track such that no part of the channeled track serves to retain the cutting line.

* * * * *